ROBERT H. FREDERICKS
INVENTOR

United States Patent Office 3,117,818
Patented Jan. 14, 1964

3,117,818
SEAT BELT POSITIONING DEVICE
Robert H. Fredericks, Dearborn, Mich., assignor to Ford Motor Company, Dearborn, Mich., a corporation of Delaware
Filed Dec. 13, 1961, Ser. No. 159,114
5 Claims. (Cl. 297—388)

This invention relates to a seat belt positioning device and more particularly to a device which yieldably holds a seat belt section in a readily accessible position when not in use.

Reluctance by the owners of motor vehicles to install seat belts has been partially due to the inconveniences caused by unfastened seat belts. Seat belt sections in an unfastened condition have a tendency to get caught in door openings or work themselves back through the opening between the seat and seat back into the rear leg room area to the annoyance of passengers. Currently, the majority of commercially available seat belt positioning devices are either too expensive to purchase or to install since, very frequently, extensive modifications to the seat belts and seat or to the vehicle structure are required.

The seat belt positioning device embodying the present invention comprises a simple, inexpensive and easily installed elastic member which has one end fastened to the seat back of a seat while the other end is coupled to a section of a seat belt. The elastic member yieldably holds the end portion of the seat belt section against the side surface of the seat back when the seat belt is not in use.

Other objects, advantages and features of this invention will become more apparent as the description proceeds, particularly when considered in connection with the drawings in which.

Figure 1:
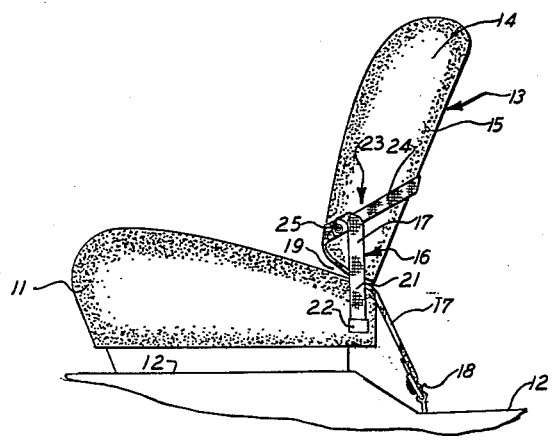
FIGURE 1 is a side elevational view of an unoccupied vehicle seat illustrating the application thereto of the seat belt positioning device embodying the present invention.

Referring now to the drawings, in FIGURE 1 can be seen a seat 11 mounted on a floor 12 of a motor vehicle. The seat 11 has a seat back 13 which is rigidly or pivotally attached to the back of the seat 11. The seat back 13 has a side surface 14 as seen in FIGURE 1 and a back surface 15 best seen in FIGURE 2.

A seat belt section 16 of a construction presently commercially available comprises a piece of seat belt webbing 17 having one end attached to a bracket 18 which is permanently secured to the floor 12 of the vehicle behind the seat 11. The seat belt webbing 17 passes through an opening 19 between the seat back 13 and the seat 11 and has an end portion 21. The end portion 21 is extensible across the seat 11 and has a tongue 22 attached to the end of the seat belt section 16. The tongue 22 permits the threading of the seat belt webbing 17 through a quickly releasable buckle attached to a complementary seat belt section (not shown) to strap the occupant into the seat 11 to avoid possible injury to the occupant in case of a sudden stop by the vehicle.

Figure 2:
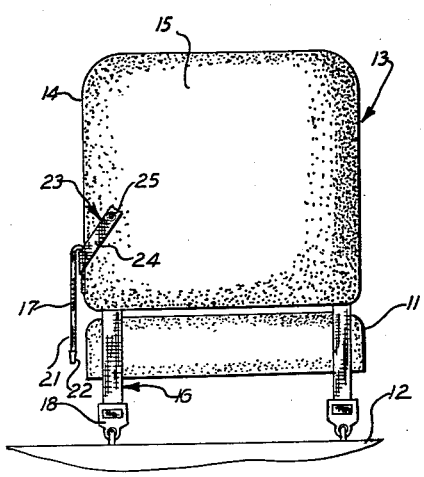
FIGURE 2 is a rear elevational view thereof.

The seat belt positioning device of this invention, generally designated 23, comprises an elastic strap 24 which has one end attached to the outer surface of the end portion 21 approximately ten inches from its tongue 22. The other end of the elastic strap 24 is attached to the back surface 15 of the seat 11 as seen in FIGURE 2. As shown in the drawings, the elastic strap 24 may be attached to the seat belt section 16 and the back surface 15 of the seat back 13 by snap-type fasteners 25 which readily permit the removal of the elastic strap 24 in case the seat belt positioning device 23 is not desired by the occupant or needs replacement. The elastic strap 24 may also be coupled to the seat belt section 16 by sewing it directly to the webbing 17 and to the fabric covering the seat back 13 or by utilizing any other commercially available fastening means.

The elastic strap 24 is secured to the seat back 13 at a location which will maintain the tongue 22 of the seat belt section 16 above the floor 12 of the vehicle when the seat belt section 16 is not in use as seen in FIGURES 1 and 2. This not only will prevent the seat belt webbing 17 from getting caught in the door or in the rear seat well but will also permit the occupant of the vehicle to locate the tongue 22 of the seat belt section 16 when applying the seat belt.

Figure 3:
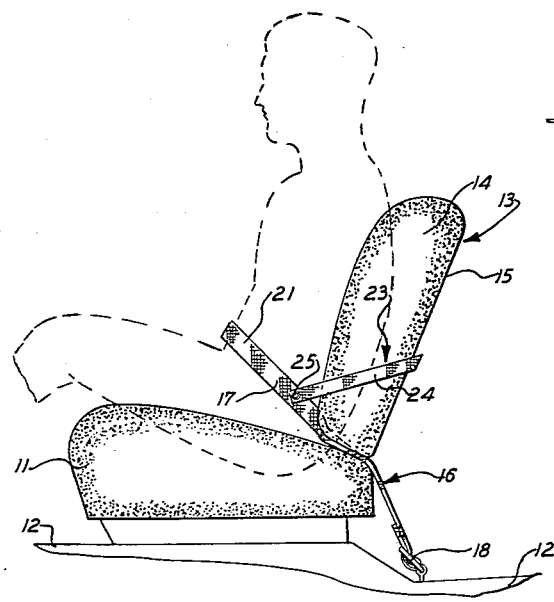
FIGURE 3 is a view in part similar to FIGURE 1 illustrating the position of the seat belt positioning device when the vehicle seat is occupied and the seat belt is fastened about the seat occupant.

When the seat belt is fastened across the occupant's lap as seen in FIGURE 3, the elastic strap 24 stretches so as not to interfere with the use of the seat belt. The elastic strap 24 possesses sufficient elasticity to retract the end portion 21 of the seat belt section 16 against the side surface 14 of the seat back 13 when the seat belt is in an unfastened condition.

The seat belt positioning device 23 may be used on either a two-door or four-door motor vehicle. When the seat back 13 is folded across the front seat upon entering or leaving a two-door vehicle, the elastic strap 24 stretches so as not to interfere with the folding of the seat back 13 of the front seat 11.

In a motor vehicle having bucket-type seats, the seat belt positioning device 23 may be readily applied to seat belt sections 16 carrying the tongue 22 or a buckle (not shown) to provide a positioning means for the entire seat belt.

It is to be understood that this invention is not to be limited to the exact construction shown and described but that various changes and modifications may be made without departing from the spirit and scope of the invention as defined in the appended claims.

I claim:

1. A seat belt positioning device for a seat belt having an end segment extensible in a fastened condition across a seat, said seat having a seat back, said seat back having a back surface and a side surface, said seat belt positioning device comprising an elastic member having one end attached to the back surface of said seat back and its other end attached to said end segment of said seat belt intermediate its ends, said elastic member yieldably holding said end segment of said seat belt in juxtaposition to the side surface of said seat back when said seat belt is in an unfastened condition.

2. A seat belt positioning device for a seat belt having sections, said seat belt sections having end segments extensible across a seat when in a fastened condition, said seat including a seat back having a back surface and a side surface, said seat belt positioning device comprising an elastic strap having at one end a first means for attachment to the back surface of said seat back, the other end of said elastic strap having a second means for attachment to the end segment of one seat belt section intermediate its ends, an intermediate portion of said elastic strap being coextensive with the side surface of said seat back, said elastic strap yieldably holding the end segment of one seat belt section in a nonextended relation against the side surface of said seat back when said seat belt section is in an unfastened condition.

3. A seat belt positioning device as described in claim 2 and which is further characterized in that said first means and said second means are also detachable.

4. In combination, a vehicle having a floor, a seat mounted on said floor, said seat including a seat back having a back surface and a side surface, a seat belt having one end attached to said floor and extending through an opening between the seat back and the seat, said seat belt terminating in an end segment extensible across said seat when said seat belt is in a fastened condition, said end segment having a fastening means at the end thereof, and a seat belt positioning device, said seat belt positioning device comprising an elastic member having one end attached to the back surface of said seat back and its other end attached to said end portion at a point inward from its other end, said elastic member yieldably maintaining said end portion of said seat belt in juxtaposition to the side surface of said seat back and said fastening means above the floor of the vehicle when said seat belt is in an unfastened condition.

5. In combination, a vehicle having a floor, a seat mounted on said floor, said seat having a seat back thereon comprising a back surface and a side surface, a seat belt having sections thereof, one end of a seat belt section being attached to said floor, said seat belt section extending through an opening between the seat back and the seat and terminating in an end segment extensible across the seat when the seat belt is in a fastened condition, said end segment having a fastening means at the end thereof, and a seat belt positioning device, said seat belt positioning device comprising an elastic strap having one end attached to the back surface of said seat back and the other end attached to the outwardly facing surface of said end segment of said seat belt section inward from its other end, said seat belt positioning device yieldably retaining one portion of said end segment against the side surface of said seat back thereby allowing a second portion of said end segment to be twisted to retain the remaining portion thereof in juxtaposition to the side surface of said seat back and said fastening means above the floor of the vehicle when said seat belt section is in an unfastened condition.

References Cited in the file of this patent

UNITED STATES PATENTS

| | | |
|---|---|---|
| 2,480,915 | George | Sept. 6, 1949 |
| 2,798,539 | Johnson | July 9, 1957 |
| 2,830,655 | Lalande | Apr. 15, 1958 |